Patented Jan. 31, 1939

2,145,617

UNITED STATES PATENT OFFICE 2,145,617

METHOD OF PREPARATION OF ACYLACETIC ARYLIDES

Frederic H. Adams, Somerville, N. J., assignor to The Calco Chemical Company, Inc., Somerset, N. J., a corporation of Delaware No Drawing. Application October 28, 1937, Serial No. 171,477

18 Claims. (Cl. 260—562)

This invention relates to an improved method of producing arylides of beta-ketonic acids, and more especially, of acetoacetic acid.

The arylides of acetoacetic acid are important intermediates for the production of various azo dyes, such as yellow ice-colors and the Hansa yellows. In the past these arylides have been produced by reacting acetoacetic ester with the corresponding amine. This reaction, however, has not in the past given good yields because the reaction is complicated by the fact that by-products are formed depending on the temperature, such as the corresponding Schiff's base of the ester, Schiff's base of the arylide, a diaryl urea and the like. It has been proposed in the past to carry out the reaction in an inert solvent, to use pyridine as a catalyst or to use an excess of the ester or of the amine. None of these modifications have generally been satisfactory. The degree of difficulty encountered has varied with different arylides, some giving fairly good yields and others giving low yields or none at all.

According to the present invention, a catalyst is used consisting of a small amount of an alkylol amine such as an ethanol amine, a betahydroxypropylamine, etc. The reaction proceeds much more smoothly and improved yields are obtained. It is an important advantage of the present invention that the small amount of alkylol amine acts catalytically in all of the general processes which have been used hitherto and which include reaction in an inert solvent, such as xylene, with continuous distillation of the alcohol produced in the reaction; reaction in the presence of an excess of ester or amine; and the like.

The present invention is applicable to the production of arylides of acetoacetic acid with various amines, such as for example, aniline and its homologs, various halogenated anilines and their homologs, nitroanilines, phenetidines, anisidines and the like; diamines such as benzidine, o-tolidine, o-dianisidine; and heterocyclic amines such as 2-amino benzothiazols. The process is also useful in the production of arylides of other betaketonic acids such as benzoylacetic acid, furoylacetic acid and the like.

The invention will be described in conjunction with the following specific examples which are typical illustrations of the invention but which are not intended to limit the invention to the details therein set forth. The parts are by weight.

Example 1

A mixture of 49 parts of ethyl acetoacetate, 55 parts of xylene and 2.75 parts of diethanolamine was heated to 135° C. in the reaction vessel equipped with a stirrer and a short fractionating column with a water-cooled condenser. 34.25 parts of p-phenetidine in 55 parts of xylene were then added gradually during a period of 1½ hours, stirring being maintained during the addition, the temperature being kept at 135–138° C. After all of the p-phenetidine had been added, the heating was continued for an additional half-hour and the reaction mixture then cooled to 5° C. whereby the crystalline p-phenetidide of acetoacetic acid precipitated out. The precipitate was filtered, washed three times with small portions of xylene, dried in a vacuum dryer at 65° C. A yield of 80–85% of pure colorless product was obtained, which is completely soluble in dilute alkali.

This yield should be contrasted with yields obtained with small amounts of pyridine used as a catalyst as proposed by Fierz-David, Helv. Chim. Acta II (1928), page 779, instead of diethanolamine. With pyridine a yield of only 14–19% is obtainable. When another modification of the prior art, using excess acetoacetic ester, was tested, the yield was less than 10% in spite of the fact that extravagant claims over 90% have been made for this process in the literature.

Example 2

The o-phenetidide was produced following the same procedure described in Example 1 on substituting an equivalent amount of o-phenetidine for the p-phenetidine. The yield obtained was 60–65% as contrasted with a 5–10% yield with pyridine.

Example 3

The p-nitranilide of acetoacetic acid was produced by following the procedure of Example 1 on substituting an equivalent amount of p-nitraniline for the p-phenetidine. The yield of 67–72% of pure p-nitranilide of acetoacetic acid was obtained whereas when the process of the prior art was used, with pyridine as a catalyst, no p-nitranilide was obtained but on the contrary, a high melting substance was produced which is not soluble in dilute alkali.

Example 4

The procedure of Example 1 was followed with p-anisidine substituted for p-phentidine and the yield of 85–90% of the corresponding p-anisidide was obtained. The product was pure and colorless and completely soluble in dilute alkali.

Example 5

65 parts of ethyl acetoacetate, 55 parts of xylene and 2.8 parts of triethanolamine were heated to 135° C. in a reaction vessel equipped with a stirrer and a short fractionating column with a water-cooled condenser. 34.25 parts of p-phenetidine and 55 parts of xylene were then gradually added during a period of 1½ hours and stirring was maintained during the addition, the heating being maintained for a half hour after the addition was complete. The reaction mixture was then cooled, the crystalline p-phenetidide separated out and purified as described in Example 1. A yield of about 70% was obtained.

Example 6

A mixture of 78 parts of ethyl acetoacetate, 110 parts of xylene and 4.4 parts of diethanolamine was heated to 135° C. in a reaction vessel equipped with a stirrer and a short fractionating column with a water-cooled condenser. A hot solution of 36.8 parts of benzidine in 220 parts of xylene was gradually added during a period of one hour, stirring being maintained during the addition while the temperature was maintained at 135-138° C. After all of the benzidine has been added the heating and stirring were continued for a half hour. The mixture was cooled to 20° C. and the crystalline bisacetoacetbenzidide was filtered of. washed with exylene and dried at 100° C. The yield was practically quantitative.

The process of the present invention is generally applicable to the production of arylides from aromatic and heterocyclic amines having at least one reactive hydrogen in the amino group. Compounds such as tertiary amines which do not have reactive hydrogens attached to nitrogen are in general not capable of forming arylides and the process of the present invention is therefore not applicable to such compounds.

What I claim is:

1. A process of producing arylides of acylacetic acids which comprises bringing about reaction between an ester of the acylacetic acid and an aromatic amine having a reactive hydrogen atom in the amino group in the presence of an alkylol amine.

2. A method according to claim 1 in which the reaction takes place in the presence of an inert solvent.

3. A method according to claim 1 in which the reaction takes place in the presence of an inert solvent and the temperature is maintained sufficiently high to distill off the alcohol corresponding to the ester.

4. A process of producing arylides of acetoacetic acid which comprises bringing about reaction between an ester of acetoacetic acid and an aromatic amine having a reactive hydrogen atom in the amino group in the presence of an alkylol amine.

5. A method according to claim 4 in which the reaction takes place in the presence of an inert solvent.

6. A method according to claim 4 in which the reaction takes place in the presence of an inert solvent and the temperature is maintained sufficiently high to distill off the alcohol corresponding to the ester.

7. A process of producing arylides of acylacetic acids which comprises bringing about reaction between an ester of the acylacetic acid and an aromatic amine having a reactive hydrogen atom in the amino group in the presence of an ethanolamine.

8. A method according to claim 7 in which the ethanolamine is diethanolamine.

9. A method according to claim 7 in which the reaction takes place in the presence of an inert solvent.

10. A method according to claim 7 in which the reaction takes place in the presence of an inert solvent and the temperature is maintained sufficiently high to distill off the alcohol corresponding to the ester.

11. A process of producing arylides of acetoacetic acid which comprises bringing about reaction between an ester of acetoacetic acid and an aromatic amine having a reactive hydrogen in the amino group in the presence of an ethanolamine.

12. A method according to claim 11 in which the ethanolamine is diethanolamine.

13. A method according to claim 11 in which the reaction takes place in the presence of an inert solvent.

14. A method according to claim 11 in which the reaction takes place in the presence of an inert solvent and the temperature is maintained sufficiently high to distill off the alcohol corresponding to the ester.

15. A process of producing arylides of acetoacetic acid which comprises bringing about reaction between an ester of acetoacetic acid and an aromatic monamine having a reactive hydrogen atom in the amino group in the presence of an ethanolamine.

16. A process of producing arylides of acetoacetic acid which comprises bringing about reaction between an ester of acetoacetic acid and an aromatic diamine having a reactive hydrogen atom in the amino group in the presence of an ethanolamine.

17. A process of producing the p-phenetidide of acetoacetic acid which comprises bringing about reaction between an ester of acetoacetic acid and p-phenetidine in the presence of an ethanolamine.

18. A process of producing the p-nitranilide of acetoacetic acid which comprises bringing about reaction between an ester of acetoacetic acid and p-nitraniline in the presence of an ethanolamine.

FREDERIC H. ADAMS.